3,138,820
DISPOSABLE TOOTH CLEANING AND GUM MASSAGE DEVICE AND METHOD FOR MAKING SAME
George Sterling August, 9225 Colesville Road, Silver Spring, Md.
No Drawing. Filed Oct. 5, 1961, Ser. No. 143,060
6 Claims. (Cl. 15—506)

This invention relates to a disposable tooth cleaning and gum massage device adapted for insertion into the mouth of the user, to be applied to the surfaces of the teeth by chewing or rubbing, and to the method of making the same. More particularly, the invention concerns a disposable tooth cleaner comprising a flat, thin, dry, semi-rigid tightly compressed cellular strip or pellet having incorporated within its cellular pores ingredients of a dentifrice, germicide, or medicament, or a combination thereof, which is capable of expanding in the presence of moisture to form a sponge-like body to release said ingredients in the mouth.

There has long existed a need for a disposable tooth cleaner of convenient size and shape for insertion into the mouth which will release a dentifrice upon encountering mouth moisture or saliva, and which can readily be applied for the purpose of cleansing tooth surfaces by chewing or rubbing. A tooth cleaner of this type is particularly indicated in situations where water is not available, as for example in fallout shelters, for persons who desire to obtain the equivalent of a tooth brushing after each meal, and in the case of bed-ridden patients, or of persons who lack muscular control to enable them to clean their teeth by conventional brushing.

Efforts have been made in the prior art to obtain a solution to this problem, but the results have not proved entirely satisfactory. Thus, for example, numerous devices are known in which an impregnated pad of absorbent material such as wool felt or cotton is inserted into a long-handled holder whereby a cleaning action similar to that of a conventional toothbrush is obtained. Devices of this type are obviously suitable only for superficial cleaning by a rubbing action analogous to that of brush bristles coated with dentifrice. There are also known disposable dental cleaning pads comprising a sheet of absorbent paper impregnated with dentifrice ingredients, and a non-structural cellulosic tooth cleaning powder which swells upon addition of water. However, cleaning means of these types have the disadvantage of disintegrating rapidly in the mouth, thereby providing a very brief period of activity.

Accordingly it is a broad object of the invention to provide a disposable tooth cleaner which comprises a small compact, thin dry strip of material of convenient size and shape for insertion in the mouth, which will release dentifrice and/or germicidal ingredients upon access of moisture thereto, and which can be applied to the tooth surfaces by chewing, or by manipulation with the fingers.

Another object is to provide a tooth cleaning device which does not require the addition of water from an external source, which has a smooth surface and gentle action, and will not irritate the gums, when used for gum massage, but will stimulate the blood circulation to the gums.

Still another object is to provide a tooth cleaner which may be conveniently carried about, and which will release its entire ingredients gradually thus furnishing relatively long cleansing action, lasting from about 3 to 5 minutes, or more. These and other objects will become apparent as the description proceeds, but it is to be understood that reference to specific embodiments of the invention is intended to aid in illustrating its features and advantages and is not intended to limit the invention, as it is defined in the appended claims.

In accordance with the invention there is provided a disposable tooth cleaner of convenient size and shape for insertion into the mouth, comprising a flat, thin, dry, semi-rigid, tightly compressed cellular member having incorporated within its cells or pores a dentifrice, germicide, or the like. The material which is to form the cellular member and carry the dentifrice or germicidal ingredients is one which remains relatively rigid when dry, and which will not shred or disintegrate under conditions of use, but which softens and expands when moistened to form a sponge-like mass from which the dentifrice or other ingredients are releasable when the material is subjected to deformation, as by chewing or rubbing. Under normal brushing a dentifrice is soon dissipated, but in the present material this effect is reduced since the pores reabsorb some of the dentifrice ingredients.

The preferred member to form the cellular member is one which has the structural form of a sponge, that is, a material composed of a large number of interconnecting or open pores or cells which can serve as a multiplicity of supply points from which the dentifrice ingredients are released or expelled when the material is expanded by action of moisture and then deformed as by chewing or rubbing. Among the materials which have been found especially suitable are synthetic cellular sponge or foam materials, such as, for example, viscose or cellulose sponge, regenerated cellulose sponge, polyurethane foam sponge, and the like. Materials of this character are commercially available and are made by processes well known to those skilled in the art. Thus, for example, viscose or cellulose sponge is commonly prepared by forming a solution of viscose (cellulose xanthate) into a paste, incorporating a gasifying agent, and heating the paste to obtain a cellular material of high porosity, which is dehydrated and then subjected to a high degree of compression to form a thin flat strip or sheet or semi-rigid material, retaining a sufficient degree of flexibility for convenient cutting or other manipulation. The cleaning device of the present invention may employ such a strip or sheet as a dentifrice carrier.

In accordance with the present invention, a cellular carrier material of the character described has incorporated within its cells or pores, dentifrice, germicidal, or other ingredients, of the types commonly employed in tooth pastes, tooth powders, and the like. The proportion of dentifrice or other ingredients relative to the carrier is not critical and it may be varied within wide limits. The amounts employed should be sufficient to provide adequate tooth cleaning and/or germicidal action. These ingredients are incorporated in the cellular carrier either at the time the cellular material is made, or subsequently by immersing the cellular material in a solution or suspension of the ingredients, followed by substantial dehydration of the cellular material incorporating the ingredients, preferably under vacuo, after which the treated cellular material is tightly compressed to form a dry, thin, semi-rigid layer.

Dentifrice ingredients which may be employed, and in conventional proportions, for the purposes of the invention include polishing agents, such as finely divided calcium carbonate, or magnesium carbonate, surface active agents, such as sodium lauryl sulfate, sweeteners, such as the sodium salt of saccharin, flavoring materials such as anise, wintergreen and peppermint, mild detergents such as sodium hexametaphosphate, salts such as potassium chloride or sodium chloride, vitamins, coloring matter, and the like. Germicidal materials such as hexachlorophene (2,2'-methylenebis(3,4,6-trichlorophenol) may also be used. Antiacids such as magnesium or aluminum hydroxide may be employed, and if desired, there may be included a suitable indicator, such as litmus or Congo red, to respond to mouth acidity.

Where previously formed cellular material such as cellulose sponge is utilized as a carrier, sheets or strips of the material are treated with an aqueous solution or suspension of the desired ingredients until the cellular material is substantially saturated. Then the cellular material is placed in a suitable drying oven, such as a vacuum dryer, and dried under moderate conditions of temperature and vacuum, which will not cause volatilization or decomposition of the ingredients or of the carrier. Thus, for example, a temperature between about 25° C. and about 60° C., may be employed, but for general purposes a temperature of about 40° C. has been found satisfactory. The period of drying will depend upon the nature of the ingredients and the degree of vacuum employed, which is not critical and may be varied within a wide range. Generally a dehydration period of about 12 hours has been found adequate. The dried cellular material with the ingredients incorporated within its pores or cells is removed from the drying oven and subjected to compression, as for example in a hydraulic press, to form a flat, dry, thin, semi-rigid strip or sheet having a substantially smooth, soft and nonirritating surface.

The compressed strip may be cut into small compact pieces or pellets of a convenient size and shape for insertion into the mouth, for example, 1 inch x ¼ inch rectangles. If desired, the tooth cleaner material may be made up into small packets in the form of book matches, whereby individual pieces may be removed for use as needed.

The following example will serve to illustrate the practice of the invention, but is not to be considered as limiting.

*Example*

An aqueous solution is prepared by dissolving the following ingredients in the amounts shown in 100 ml. of distilled water, with stirring:

|  | Mg. |
|---|---|
| Saccharin sodium, U.S.P. | 100 |
| Anise flavor | 200 |
| Peppermint flavor | 200 |
| Wintergreen flavor | 200 |
| Sodium lauryl sulfate | 750 |
| Carmine Red No. 40 | 50 |

The following ingredients are then added to the aqueous solution with stirring to form a dentifrice suspension:

| Calcium carbonate | gms | 18 |
|---|---|---|
| Magnesium carbonate | gms | 13.3 |
| Magnesium hydroxide | gms | 4.2 |
| Potassium chloride | gm | 0.5 |
| Sodium hexametaphosphate | mg | 75 |

A synthetic cellulose sponge compressed sheet capable of expanding by action of moisture and having a total weight of about 1 gram is expanded and saturated by immersion in the dentifrice suspension. The latter is allowed to penetrate the expanded sponge, if desired with agitation, to obtain an even distribution of the ingredients in the pores. The treated sponge sheet is placed in a drying oven and heated at 40° C. for 12 hours under a vacuum of about 5 mm. The dried product is removed and compressed to a flat semi-rigid sheet or strip, which is cut into small pieces to form tooth cleaner units.

While the present preferred embodiments and practices of the invention have been described, it will be understood that the invention is not limited thereto but may be variously embodied and practiced within the scope of the following claims.

I claim:

1. A disposable tooth cleaning and gum massage device adapted for insertion into the mouth and which will not disintegrate under conditions of use consisting essentially of a flat, thin, dry, semi-rigid, tightly compressed cellular sponge member composed of a large number of interconnecting pores, containing distributed within said pores a dentifrice, said member being chewable and capable of softening and expanding in contact with mouth moisture to form a spongy mass from which said dentifrice is gradually released upon deformation.

2. A disposable tooth cleaning and gum massage device adapted for insertion into the mouth and which will not disintegrate under conditions of use consisting essentially of a flat, thin, dry, semi-rigid, tightly compressed synthetic cellulose cellular sponge member composed of a large number of interconnecting pores, containing distributed within said pores a dentifrice, said member being chewable and capable of softening and expanding in contact with mouth moisture to form a spongy mass from which said dentifrice is gradually released upon deformation.

3. A disposable tooth cleaning and gum massage device adapted for insertion into the mouth and which will not disintegrate under conditions of use consisting essentially of a flat, thin, dry, semi-rigid, tightly compressed cellular sponge member substantially rectangular in shape composed of a large number of interconnecting pores, containing distributed within said pores a dentifrice, said member being chewable and capable of softening and expanding in contact with mouth moisture to form a spongy mass from which dentifrice is gradually released upon deformation.

4. A disposable tooth cleaning and gum message device adapted for insertion into the mouth and which will not disintegrate under conditions of use consisting essentially of a flat, thin, dry, semi-rigid, tightly compressed cellular sponge member composed of a large number of interconnecting pores, containing distributed within said pores a dentrifrice and a germicide, said member being chewable and capable of softening and expanding in contact with mouth moisture to form a spongy mass from which said dentifrice and germicide are gradually released upon deformation.

5. Method of preparing a disposable tooth cleaning and gum massage material which comprises the steps of immersing a compressed cellular sponge material comprised of a large number of interconnecting pores and which is capable of expanding under the action of moisture, in an aqueous medium containing dentifrice ingredients, allowing said sponge material to expand and allowing said ingredients to distribute uniformly within the expanded pores of said sponge material, substantially dehydrating said sponge material and contained dentifrice ingredients at a temperature between about 25° and about 60° C. under a degree of vacuum which will not cause volatilization or decomposition of the ingredients or the sponge, and then compressing said dried sponge material and contained dried ingredients to form a flat, thin, dry, semi-rigid cellular body.

6. Method of preparing a disposable tooth cleaning and gum massage material which comprises the steps of immersing a compressed synthetic cellulose cellular sponge material comprised of a large number of interconnecting pores and which is capable of expanding under the action of moisture, in an aqueous medium containing dentrifrice ingredients, allowing said sponge material to expand and allowing said ingredients to distribute uniformly within the expanded pores of said sponge material, substantially dehydrating said sponge material and contained dentrifrice ingredients at a temperature between about 25° and about 60° C. under a degree of vacuum which will not cause volatilization or decomposition of the ingredients or the sponge, and then compressing said dried sponge material and contained dried ingredients to form a flat, thin, dry, semi-rigid cellular body.

References Cited in the file of this patent

UNITED STATES PATENTS

| | | | |
|---|---|---|---|
| 1,248,675 | Kowinsky | Dec. 4, | 1917 |
| 2,591,481 | Webster | Apr. 1, | 1952 |
| 2,673,364 | Diveley | Mar. 30, | 1954 |
| 2,761,166 | Connolly | Sept. 4, | 1956 |
| 2,763,885 | Lyons | Sept. 25, | 1956 |
| 2,865,283 | Stoffer | Dec. 23, | 1958 |
| 2,893,036 | Filler et al. | July 7, | 1959 |

FOREIGN PATENTS

| | | | |
|---|---|---|---|
| 6,082 | Great Britain | Mar. 11, | 1912 |